United States Patent
Bulja et al.

(10) Patent No.: US 10,903,568 B2
(45) Date of Patent: Jan. 26, 2021

(54) ELECTROCHROMIC REFLECTARRAY ANTENNA

(71) Applicant: NOKIA TECHNOLOGIES OY, Espoo (FI)

(72) Inventors: Senad Bulja, Dublin (IE); Rose Kopf, Greenbrook, NJ (US); Robert Cahill, Jordanstown (IE); Majid Norooziarab, Blanchardstown (IE)

(73) Assignee: NOKIA TECHNOLOGIES OY, Espoo (FI)

( * ) Notice: Subject to any disclaimer, the term of this patent is extended or adjusted under 35 U.S.C. 154(b) by 168 days.

(21) Appl. No.: 16/196,517

(22) Filed: Nov. 20, 2018

(65) Prior Publication Data
US 2020/0161759 A1    May 21, 2020

(51) Int. Cl.
| | |
|---|---|
| *H01Q 3/34* | (2006.01) |
| *H01Q 1/48* | (2006.01) |
| *H01Q 9/04* | (2006.01) |
| *H01Q 21/00* | (2006.01) |
| *H01Q 21/06* | (2006.01) |

(52) U.S. Cl.
CPC ............... *H01Q 3/34* (2013.01); *H01Q 1/48* (2013.01); *H01Q 9/045* (2013.01); *H01Q 21/0087* (2013.01); *H01Q 21/065* (2013.01)

(58) Field of Classification Search
CPC .. H01Q 3/34; H01Q 3/40; H01Q 3/26; H01Q 1/48; H01Q 1/246; H01Q 9/045; H01Q 21/0087; H01Q 21/065; H01Q 25/00; H01Q 25/02
USPC ........................................................ 342/373
See application file for complete search history.

(56) References Cited

U.S. PATENT DOCUMENTS

| | | | | |
|---|---|---|---|---|
| 4,684,952 A | * | 8/1987 | Munson | H01Q 21/065 342/368 |
| 6,774,851 B1 | * | 8/2004 | Cuhaci | H01Q 3/46 343/700 MS |
| 7,009,750 B1 | | 3/2006 | Westfall | |
| 7,791,552 B1 | * | 9/2010 | Romanofsky | H01Q 15/148 343/700 MS |
| 7,830,583 B2 | * | 11/2010 | Neuman | B60R 1/088 359/265 |
| 10,320,089 B2 | * | 6/2019 | Jakoby | H01Q 3/44 |
| 2010/0085272 A1 | * | 4/2010 | Legay | H01Q 19/104 343/913 |
| 2010/0011837 A1 | | 5/2010 | Haberfelde | |
| 2014/0320356 A1 | * | 10/2014 | Bishop | H01Q 1/287 343/705 |

(Continued)

OTHER PUBLICATIONS

Extended Search Report issued in related EP Application No. 19209693.1, dated May 7, 2020, 7 pages.

*Primary Examiner* — Harry K Liu
(74) *Attorney, Agent, or Firm* — McCracken & Gillen LLC

(57) ABSTRACT

An antenna element includes a patch antenna and a microstrip line separated by an electrochromic material to tune the element. A reflectarray of a plurality of antenna elements is formed on a substrate. The dielectric permitivities of the electrochromic material may be controlled both during manufacture and during operation of the antenna to provide a phase shift to the antenna elements and beamform a signal radiated by the antenna. A bias line may be used to change a shape, direction or circular polarity of a beam radiating from the antenna.

19 Claims, 9 Drawing Sheets

(56) References Cited

U.S. PATENT DOCUMENTS

2015/0325897 A1* 11/2015 Bulja .................. G02F 1/163
                                                      333/238
2017/0111980 A1* 4/2017 B Tai ................... H04W 64/00
2018/0159239 A1    6/2018 Wyler
2019/0049788 A1* 2/2019 Kuznetsov ........ G02F 1/133514

* cited by examiner

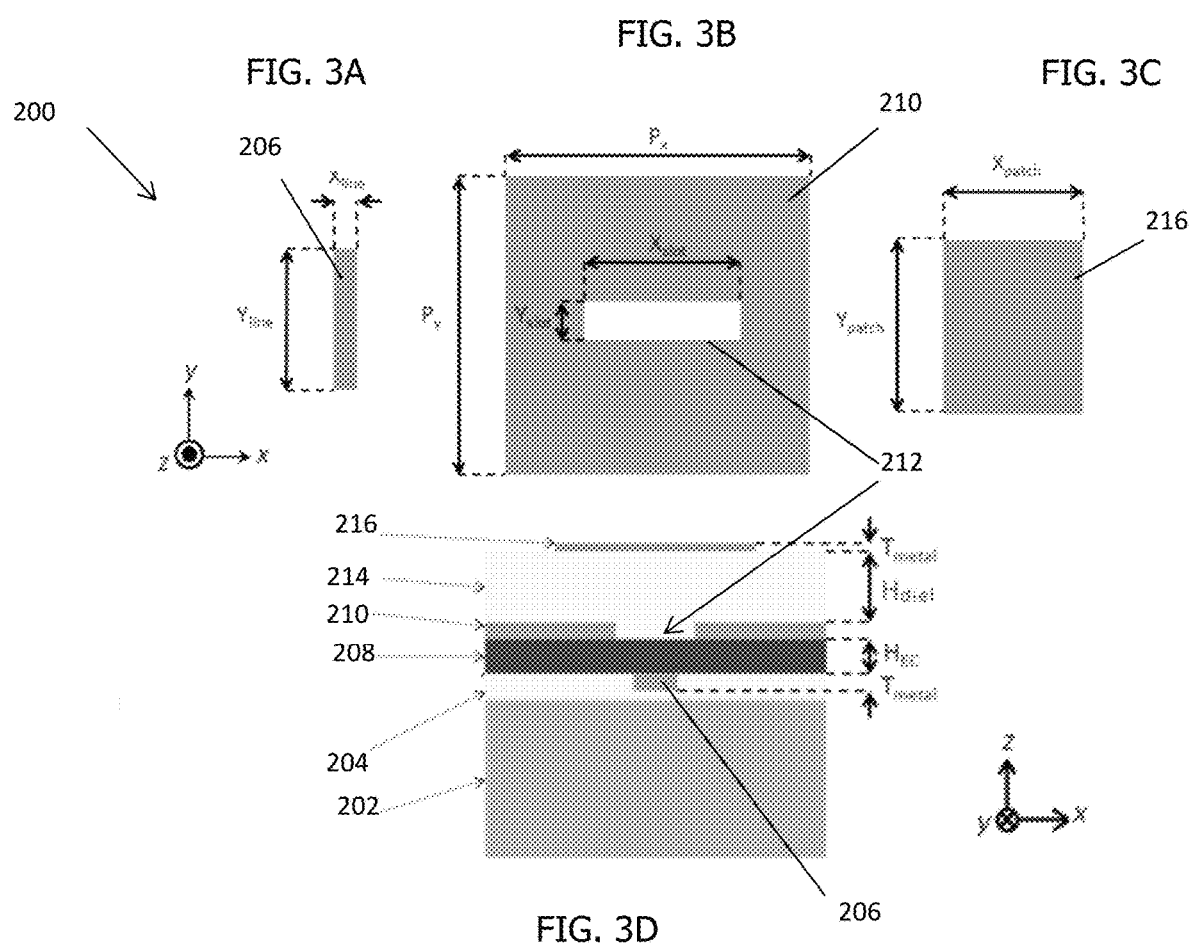

ELECTROCHROMIC REFLECTARRAY ANTENNA

CROSS REFERENCE TO RELATED APPLICATIONS

This application is related to U.S. Ser. No. 15/959,564, filed Mar. 1, 2018 titled Electrochromic Switch and to U.S. Ser. No. 15/978,370, filed Apr. 23, 2018, titled Electrochromic Cell which are incorporated by reference.

TECHNICAL FIELD

Various example embodiments relate generally to antennas and more particularly to tunable reflectarray antennas using electrochromic material.

BACKGROUND

Reflectarray antennas are similar to traditional antenna arrays, except they do not use a feed network. Instead, an array of elements is fed (illuminated) with an external antenna which is usually in the form of a horn antenna, although this may not always be the case. The radiation emanating from the horn impinges on the reflectarray and is re-radiated. The exact direction of this re-radiation depends on the phase shift which is induced between the individual antenna elements. Reflectarrays typically generate a high gain directive beam, similar to metal parabolic dishes, but the advantages are that this type of antenna is very lightweight, compact and much cheaper to manufacture and therefore more suitable for applications which require mass production. Printed array antennas can be designed to generate a similar radiation pattern, but for a large number of antenna elements, the losses in the feed network are prohibitive.

The principle of operation of a reflectarray can be understood with reference to FIG. 1, which shows a single element 10 of an aperture coupled antenna. In the configuration illustrated in FIG. 1, an incident EM wave 12 produces current flow on the antenna patch 14, which in turn, induces a current on narrow conducting line 16. Since the latter is an open circuit transmission line, the waves are reflected from the open circuited boundary and flow in the reverse direction back towards the microstrip patch 14, where the energy is subsequently radiated. In a reflectarray configuration including a number of antenna elements, the exact direction of the transmitted signal can be altered by varying the phase shift induced on the line 16, leading to "beam-forming." One way this may be done is by using a liquid crystal (LC) bulk tunable material, where the permittivity and thus electrical length of the line 16 may be controlled by applying a bias voltage.

The achievable range of dielectric permitivities for LC materials is very small and therefore, insufficient for most applications. Further, LCs are very temperature dependent and, since they are only available in liquid form, pose leakage problems and thus increased manufacturing costs.

SUMMARY

Example embodiments encompass an antenna element and a reflectarray of elements using electrochromic material to tune the antenna elements. The dielectric permitivities of the electrochromic material may be controlled both during manufacture and during operation of the antenna to provide a phase shift to the antenna elements.

An example embodiment encompasses an antenna element including a substrate; an isolation layer further comprising a microstrip line connected perpendicularly to a bias line; an electrochromic (EC) layer on the isolation layer; a ground plane layer further comprising a slot perpendicular to the microstrip line; a patch substrate layer; and a patch antenna on the patch substrate layer; wherein applying a voltage to the bias line changes a permittivity of the electrochromic layer and creates a phase shift of the antenna.

Another embodiment includes a reflectarray antenna having a plurality of antenna elements, each antenna element including a substrate; an isolation layer further comprising a microstrip line connected perpendicularly to a bias line; an electrochromic (EC) layer on the isolation layer; a ground plane layer further comprising a slot perpendicular to the microstrip line; a patch substrate layer; and a patch antenna on the patch substrate layer; wherein applying a voltage to the bias line changes a permittivity of the electrochromic layer and creates a phase shift of the plurality of antenna elements.

In any of the above embodiments, the patch substrate includes a dielectric which may be comprises silicon dioxide ($SiO_2$).

In any of the above embodiments, the EC layer includes a plurality of sublayers.

In any of the above embodiments, the EC layer may include a chromic sublayer of tungsten oxide ($WO_3$), titanium oxide ($TiO_2$), molybdenum trioxide ($MoO_3$), tantalum oxide ($Ta_2O_5$), niobium pentoxide ($Nb_2O_5$) or another transition metal oxide.

In any of the above embodiments, the EC layer further may include a chromic sublayer of nickel oxide (NiO), chromium oxide ($Cr_2O_3$), manganese oxide ($MnO_2$), iron oxide ($FeO_2$), cobalt oxide ($CoO_2$), rhodium oxide ($RhO_2$), iridium oxide ($IrO_2$) or another transition metal oxide.

In any of the above embodiments, the EC layer may include one or more electrolyte sublayers of lithium niobate ($LiNbO_3$) or any electrolyte displaying different ion and electron conductivities.

In any of the above embodiments, the isolation layer further comprises silicon dioxide ($SiO_2$).

In any of the above embodiments, the bias line of each antenna element is operatively coupled to a same voltage.

In any of the above embodiments, the bias line of each antenna element is operatively coupled to a different voltage.

In any of the above embodiments, applying a voltage to the bias line changes a shape of a beam radiating from the reflectarray antenna, a direction of a beam radiating from the reflectarray antenna or a polarity of a circular polarized beam radiating from the reflectarray antenna.

A further embodiment encompasses a method of making an antenna element further comprising a patch antenna, a dielectric substrate, a slotted ground plane, an electrochromic layer, and a microstrip line, including selecting an operating frequency; determining a thickness of the dielectric substrate, $H_{diel} > \lambda_g/40$ where $\lambda_g$ is a guided wavelength associated with the operating frequency; determining a length of the patch antenna, $Y_{patch}$; determining a length of the antenna element $P_y$; determining a width of the patch antenna ($X_{patch}$) and the microstrip line ($X_{line}$); determining a width of the antenna element $P_x$; determining a length ($X_{slot}$) and width ($Y_{slot}$) of a slot in the slotted ground plane; and determining a length of the microstrip line ($Y_{line}$).

In a further embodiment, the step of determining a length of the patch antenna, $Y_{patch}$ further comprises selecting a length between approximately $\lambda_g$ and $\lambda_g/2$.

In another embodiment, the steps of determining a length ($X_{slot}$) and width ($Y_{slot}$) of a slot in the slotted ground plane and determining a length of the microstrip line ($Y_{line}$) further comprise steps of selecting a value for $Y_{line}$ that provides an optimal phase shift with low loss; and varying $X_{slot}$ until an optimal coupling level is found.

DESCRIPTION OF THE DRAWINGS

Some example embodiments will now be described with reference to the accompanying drawings in which:

FIGS. 3A-3D show a non-resonant reflectarray antenna unit cell.

DETAILED DESCRIPTION

Electrochromic (EC) materials are materials that allow their optical and/or electrical properties to be controlled by applying a voltage. EC materials are often used as one of the layers in a multi-layer structure known as an electrochromic (EC) cell. Various characteristics of an EC cell may be engineered to tailor the EC cell for a variety of applications without changing its material composition.

Figure 1:
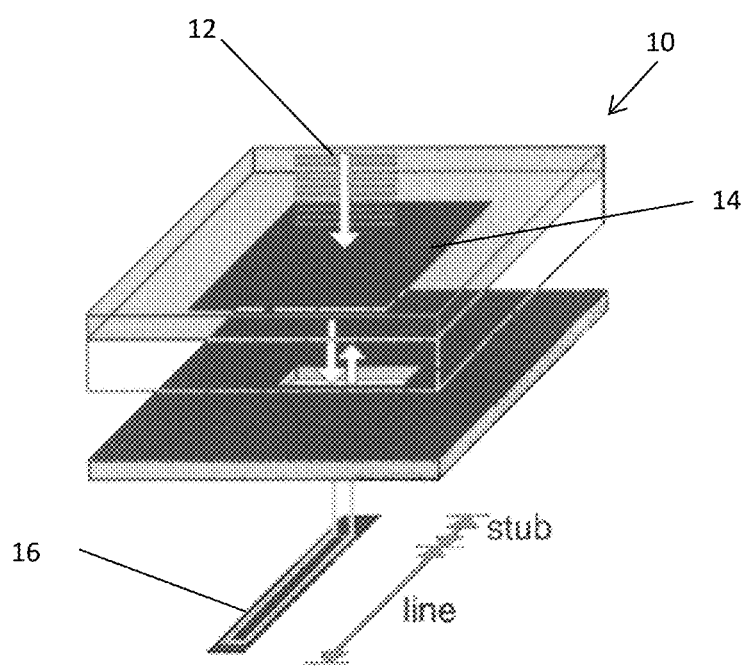
FIG. 1 shows an exploded view of a reflectarray antenna element.
Figure 2A:
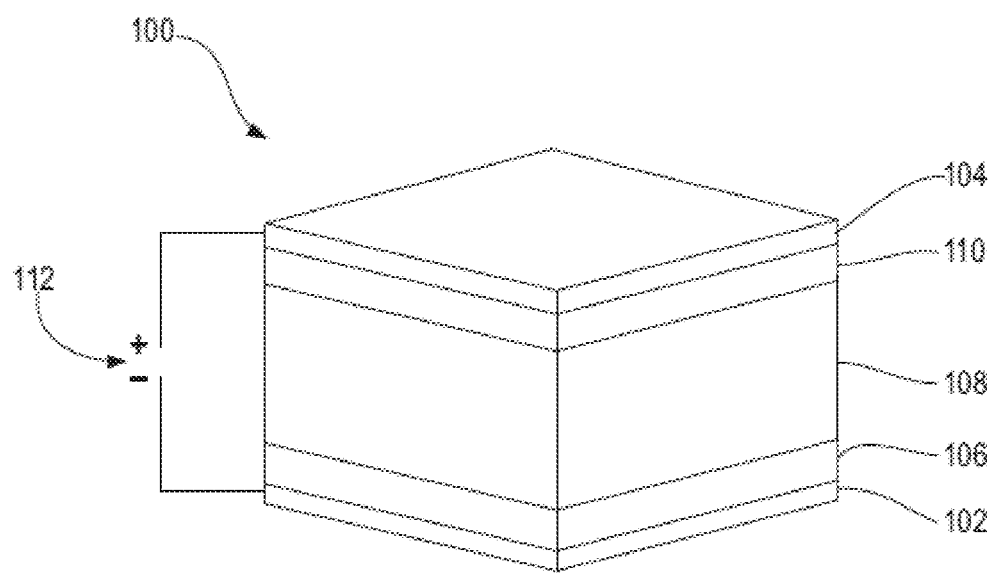
FIGS. 2A and 2B show perspective views of electrochromic (EC) cells.

An embodiment of an EC cell 100 is shown in FIG. 2A. Glass (not shown) may be used as a substrate on which is formed several layers. These layers include two conducting layers 102 and 104, at least one EC layer 106, for example, a transition metal oxide, adjacent to conducting layer 102 and an ion-conducting or electrolyte layer 108 between EC layer 106 and either the other conducting layer 104 or a second EC layer 110. In an embodiment, layer 108 is lithium niobate (LiNbO$_3$), although any electrolyte displaying different ion and electron conductivities, typically $\sigma_I > 10^{-7}$ S/cm (siemens per centimeter) for ions and $\sigma_E > 10^{-10}$ S/cm for electrons, may be used.

In an embodiment, layers 102 and 104 are conductors, for example, gold, indium tin oxide (ITO), zinc oxide (ZnO), a conductive polymer or any material that is a good electrical conductor. Layer 106 is a chromic film, for example, tungsten tri-oxide (WO$_3$), however, a variety of other transition metal oxides may be used, such as titanium oxide (TiO$_2$), molybdenum trioxide (MoO$_3$), tantalum oxide (Ta$_2$O$_5$) or niobium pentoxide (Nb$_2$O$_5$). Layer 110 is another chromic film, also understood as an ion storage film, chosen to have complementary electrochromic characteristics to chromic film layer 106. Layer 110 may be, for example, nickel oxide (NiO), although a variety of other transition metal oxides, such as chromium oxide (Cr$_2$O$_3$), manganese oxide (MnO$_2$), iron oxide (FeO$_2$), cobalt oxide (CoO$_2$), rhodium oxide (RhO$_2$) or iridium oxide (IrO$_2$).

EC cell 100 is actuated by applying a voltage to conductive layers 102 and 104. This voltage is provided by, for example, voltage source 112. In a non-actuated state, EC layers 106 and 110 are non-conductive and behave as insulators. Electrolyte layer 108 is non-conductive in both actuated and non-actuated states. Upon application of a DC bias voltage between conducting layers 102 and 104, ions from electrolyte layer 108 are expelled and subsequently injected into the one or more EC layers 106 and 110 through a process of intercalation, which changes the fundamental characteristics of the EC layers.

Figure 2B:
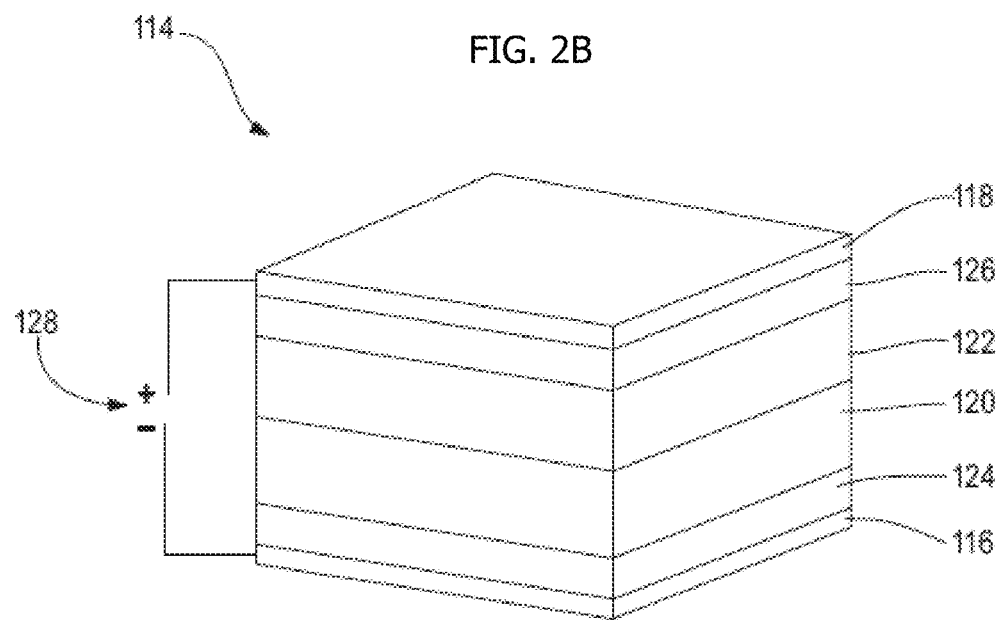

FIG. 2B illustrates another embodiment of an electrochromic (EC) cell at 114. Top and bottom layers 116 and 118 are conductors, for example, gold, indium tin oxide (ITO), zinc oxide (ZnO), a conductive polymer or any material that is a good electrical conductor. Layer 120 is a chromic film, for example, tungsten tri-oxide (WO$_3$), however, a variety of other transition metal oxides may be used, such as titanium oxide (TiO$_2$), molybdenum trioxide (MoO$_3$), tantalum oxide (Ta$_2$O$_5$) or niobium pentoxide (Nb$_2$O$_5$). Layer 122 is another chromic film, also understood as an ion storage film, chosen to have complementary electrochromic characteristics to chromic film layer 120. Layer 122 may be, for example, nickel oxide (NiO), although a variety of other transition metal oxides, such as chromium oxide (Cr$_2$O$_3$), manganese oxide (MnO$_2$), iron oxide (FeO$_2$), cobalt oxide (CoO$_2$), rhodium oxide (RhO$_2$) or iridium oxide (IrO$_2$). In an alternative embodiment of EC cell 114, layer 122 is not present.

Layers 124 and 126 are ion-conducting layers, for example, an electrolyte. In an embodiment, layers 124 and 126 are lithium niobate (LiNbO$_3$), although any electrolyte displaying different ion and electron conductivities may be used. Layers 124 and 126 serve as a tank for providing available ions to be injected into chromic layers 120 and 122 when a DC bias voltage is applied between bottom layer 116 and top layer 118. This voltage is provided by, for example, voltage source 128. Layers 124 and 126 may both be formed from the same or different electrolyte materials.

Depending on the application, EC cell 114 of FIG. 2B may also include one or more substrates, not shown for conciseness. These substrates may be glass, for example, but any structurally stable substrates may be used.

Each of the layers in an EC cell exhibits a capacitance, with the total equivalent capacitance of the EC cell related to the sum of the capacitances of the constituent layers. The capacitance of each layer is proportional to the dielectric permittivity. By modulating the dielectric permittivity, it is possible to change the operational characteristics of the EC cell. Thus, the EC cells described above have many applications in both the MM-wave and optical domains, for example, in displays with a tailor-made optical response and beam-forming function as well as tunable optical and microwave devices, such as phase shifters, switches, attenuators and antennas.

In an embodiment, EC materials may be used to provide a beam forming function in a reflectarray antenna. A non-resonant reflectarray antenna unit cell 200 is shown in FIGS. 3A-3D. FIGS. 3A-3C show front views of portions of unit cell 200 while FIG. 3D shows a side view of unit cell 200. The same reference numbers indicate the same element in all figures. The overall cell has dimensions of $P_x$ and $P_y$. Substrate 202 provides a base for the cell and is made from silicon, for example, although other substrates, such as glass, may be used. An isolation layer 204 may be any suitable dielectric such as silicon dioxide (SiO2), silicon nitride (SiN) or benzocyclobutane (BCB), for example. A microstrip delay line 206 is etched in isolation layer 204 and filled with a metal, for example 1 µm gold (Au). However, other conductors may also be used. Microstrip delay line has dimensions $X_{line}$ and $V_{line}$ and a thickness $T_{metal}$. An electrochromic (EC) dielectric layer 208 is formed on isolation layer 204 with a thickness of $H_{EC}$.

EC layer 208 may be an EC cell as shown and discussed above with reference to FIGS. 2A and 2B. As such, EC layer 208 includes a stack of sublayers. One sublayer is a chromic film of tungsten tri-oxide ($WO_3$), however, a variety of other transition metal oxides may be used, such as titanium oxide ($TiO_2$), molybdenum trioxide ($MoO_3$), tantalum oxide ($Ta_2O_5$) or niobium pentoxide ($Nb_2O_5$). EC layer 208 also includes an ion storage sublayer which may be, for example, nickel oxide (NiO), although a variety of other transition metal oxides, such as chromium oxide ($Cr_2O_3$), manganese oxide ($MnO_2$), iron oxide ($FeO_2$), cobalt oxide ($CoO_2$), rhodium oxide ($RhO_2$) or iridium oxide ($IrO_2$). EC layer 208 also includes one or more electrolyte sublayers, such as lithium niobate ($LiNbO_3$), although any electrolyte displaying different ion and electron conductivities, typically $\sigma_I > 10^{-7}$ S/cm (siemens per centimeter) for ions and $\sigma_E > 10^{-10}$ S/cm for electrons, may be used.

A slotted ground plane layer 210 is formed on EC layer 208. Slot 212 has dimensions $X_{slot}$ and $Y_{slot}$ and a thickness of approximately 1 μm. Ground plane layer 210 may be formed from 1 μm Au. However, other conductors may also be used. Patch substrate 214 has a thickness $H_{diel}$ and may be made from, for example silicon dioxide ($SiO_2$) or benzocyclobutane (BCB), although any suitable dielectric may be used. Finally, patch antenna 216 with dimensions $X_{patch}$ and $Y_{patch}$ and a thickness $T_{metal}$ s located on dielectric substrate 214. Patch antenna 216 may be formed from 1 μm Au. However, other conductors may also be used.

EC layer 208 functions as a bottom substrate for microstrip delay line 206 and is considered to be tunable EC material with permitivities of $\varepsilon_r = 34.2$ (unbiased) and $\varepsilon_r = 36.9$ (biased) with tan δ=0.02 for both states. The thickness of the metal layers is $T_{metal} = 1$ μm while the thickness of EC layer 208 is approximately $H_{EC} = 1$ μm. However, the values used here are examples only and may be adjusted according to the dielectric characteristics of EC materials.

In an embodiment, dielectric substrate 214 for the radiating patch is BCB with $\varepsilon_r = 2.65$ and tan δ=0.0008 for ease of deposition and reduced losses. The thickness of the patch substrate determines the impedance bandwidth of the radiating element. A thicker substrate results in a wider bandwidth but less coupling to the delay line, which results in the reduction of the tunable phase shift range. A method of determining the dimensions indicated in FIGS. 3A and 3B are determined is discussed in connection with the flowchart of FIG. 4.

Figure 4:
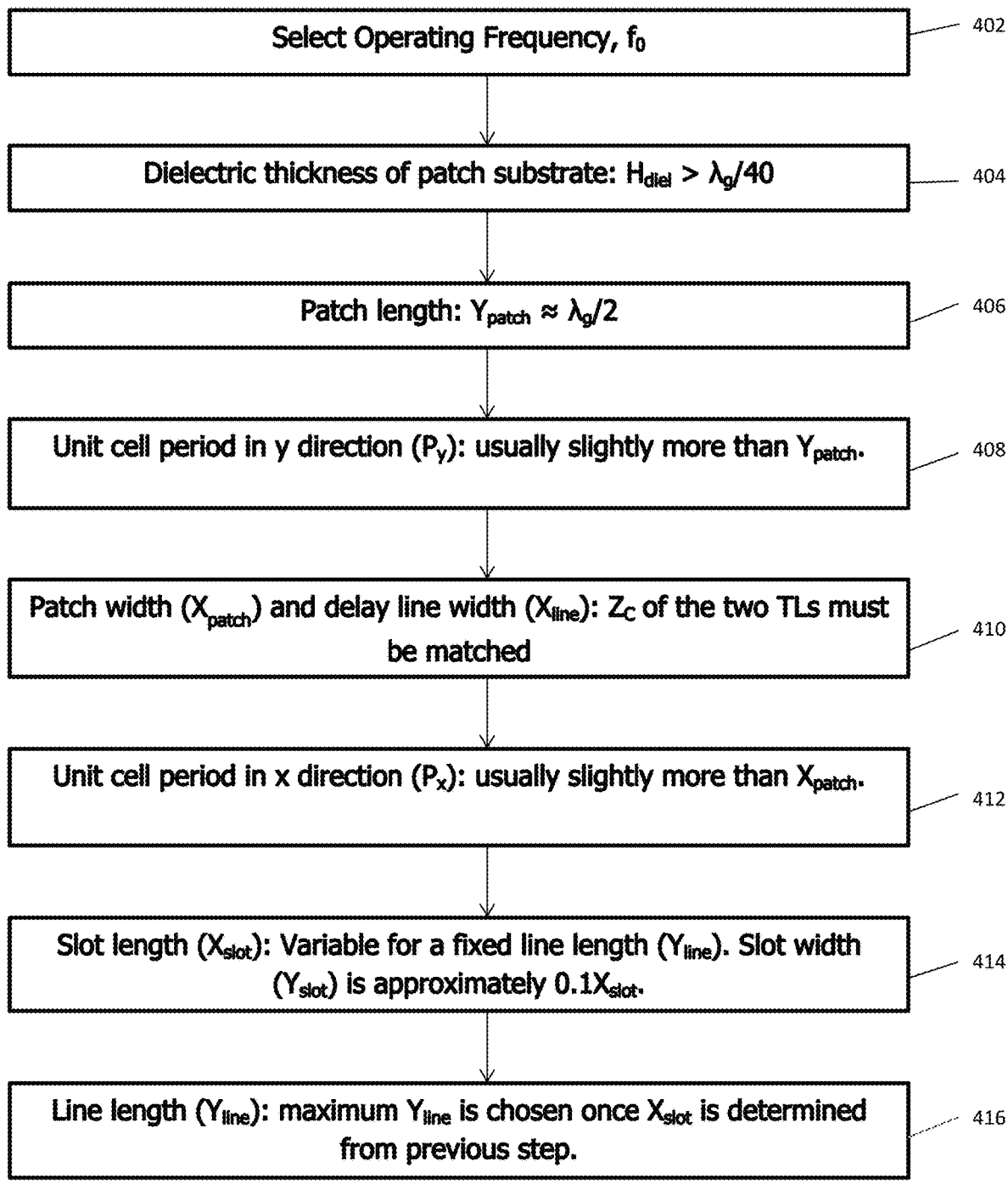
FIG. 4 is a flowchart depicting a method of determining parameters for the unit cell of FIGS. 3A-3D.

Referring to the flow chart of FIG. 4, an example embodiment of a reflectarray unit cell is designed with a selected operating frequency in step 402 of $f_0 = 299.7$ GHz. In step 404, the thickness of dielectric layer $H_{diel}$ 214 (FIG. 3B) is determined as being greater than $\lambda_g/40$ where $\lambda_g$ is the guided wavelength associated with $f_0$. In step 406, the length of patch antenna $Y_{patch}$ is approximately equal to $\lambda_g/2$. This then determines the unit cell period in the y as direction ($P_y$) slightly more than $Y_{patch}$ in step 408. The periodicity of both $P_x$ and $P_y$ determine the radiation characteristics of the array. More specifically, the periodicity determines the angular position and magnitudes of the sidelobes of the reflectarray antenna. Usually, there is a compromise on the values of the periodicity, but for good performance the periodicity needs be between 0.5 $\lambda g$ and $\lambda g$. In step 410, the x dimensions of patch 216 and delay line 206 are determined such that the input impedance is matched to the characteristic impedance $Z_C$ of the microstrip line. This is done to avoid reflections, which reduce antenna efficiency. In step 412, a unit cell period in the x direction ($P_x$) may now be determined from $X_{patch}$ similarly to the determination of $P_y$ described above. In step 414, dimensions of slot 212 are determined. In step 416, $Y_{line}$ is determined. Although these steps are shown as sequential, the determination of $X_{slot}$ and $Y_{line}$ is designed at the same time in an iterative way for best performance. The design criteria is matching the characteristic impedance of the line as determined by $Y_{line}$ and the amount of coupling the patch antenna receives (as determined by $X_{slot}$). In an embodiment, this matching is done by selecting $Y_{line}$ for best phase shift and low losses, then $X_{slot}$ is varied until the desired coupling level is reached.

A summary of the dimensions determined in the above example are as indicated in Table I. The dimensions shown are to illustrate principles of the example embodiment. The disclosed reflectarray antenna is not limited to these specific dimensions.

TABLE I

Geometric and dielectric dimensions of an EC Reflectarray Element at $f_0$ = 299.7 GHz

| | |
|---|---|
| Patch substrate | $H_{diel}$ = 20 μm, $\varepsilon_r$ = 2.65, tan$\delta_{diel}$ = 0.0002 |
| Delay line | $H_{EC}$ = 1 μm, $\varepsilon_{r-EC}$ (unbiased) = 34.2, $\varepsilon_{r-EC}$ (biased) = 36.9, tan$\delta_{EC}$ = 0.02 |
| Metal layers | $T_{metal}$ = 1 μm, σ = 3.4 × 10⁷ S/m |
| Geometric dimensions (all in μm) | $P_x$ = 370, $P_y$ = 310, $Y_{patch}$ = 250, $X_{patch}$ = 310, $X_{slot}$ = 240, $Y_{slot}$ = 24, $X_{line}$ = 5, $Y_{line}$ = 60 |

Figure 5A:
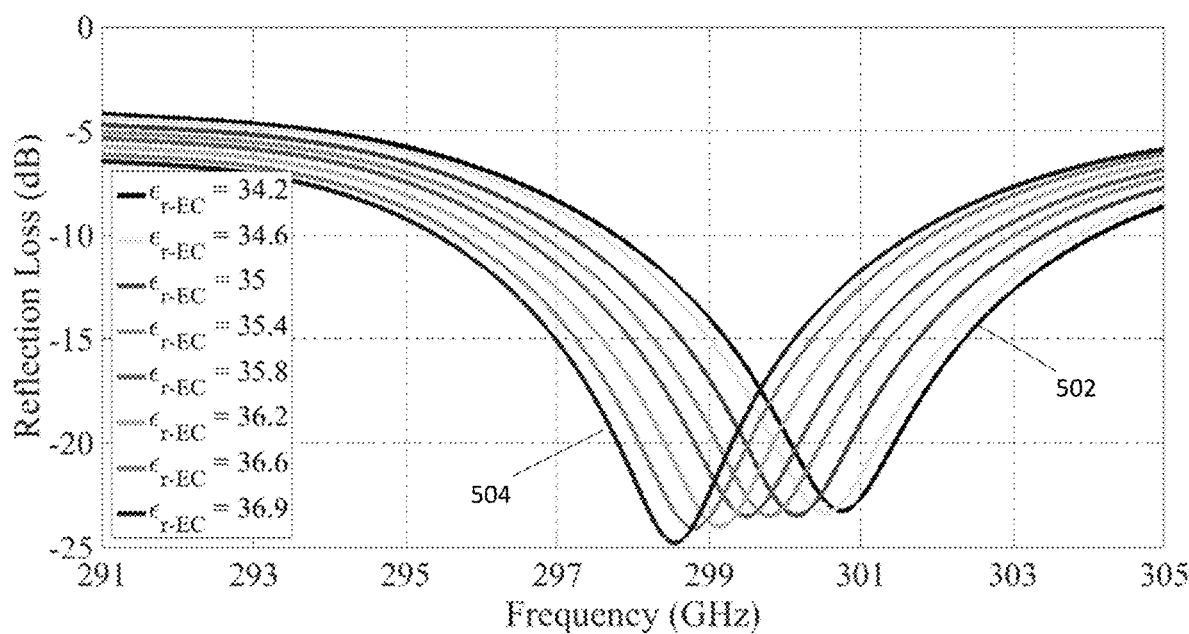
FIG. 5A shows a graph for a reflection loss of the unit cell of FIGS. 3A-3D.
Figure 5B:
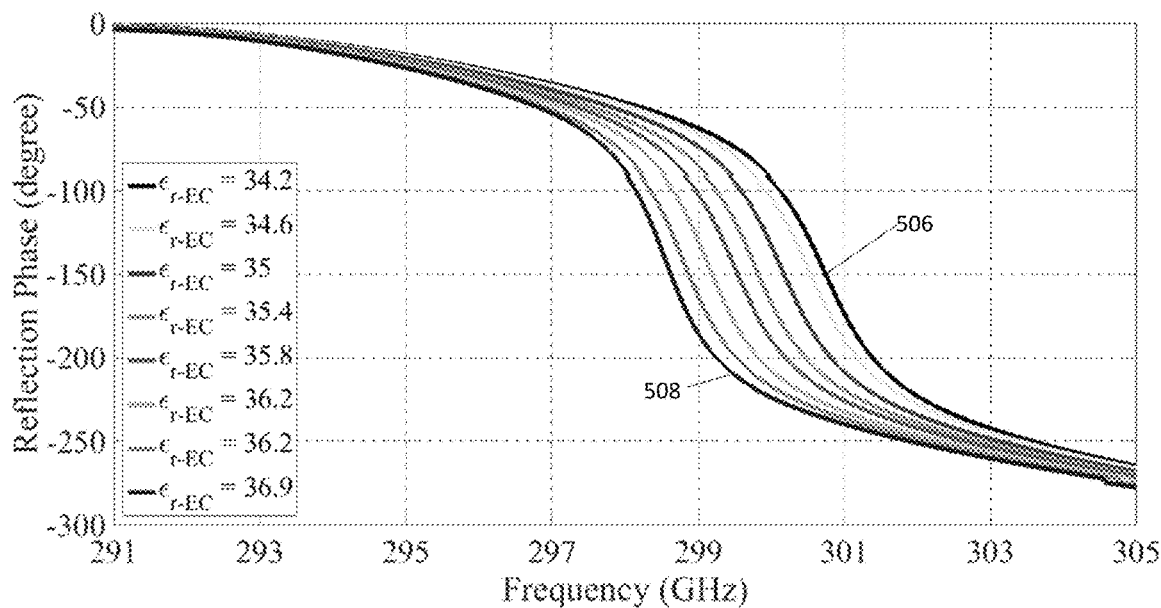
FIG. 5B shows a graph for a phase of the unit cell of FIGS. 3A-3D.

FIG. 5A shows the simulated reflection loss in dB vs. frequency of operation in GHz of the example reflectarray element for several different values of the EC dielectric constant between $\varepsilon_{r-EC}$ (unbiased)=34.2 as line 502 and $\varepsilon_{r-EC}$ (biased)=36.9 as line 504. FIG. 5B shows the phase in degrees vs. frequency of the example reflectarray element for several different values of the EC dielectric constant between $\varepsilon_{r-EC}$ (unbiased)=34.2 as line 506 and $\varepsilon_{r-EC}$ (biased) =36.9 as line 508.

Figure 5C:
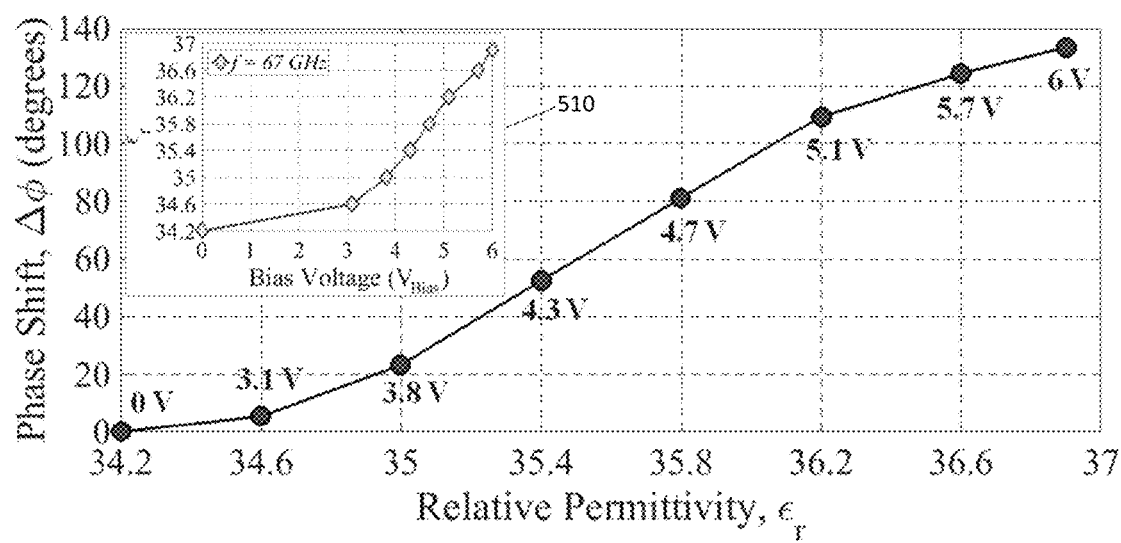
FIG. 5C shows a graph for a reflection phase shift of the unit cell of FIGS. 3A-3D.

The best estimate for the required bias voltage for each phase shift is also shown in FIG. 5C. The angle of incidence is φ=0° and θ=45° for TE (transverse electric) waves. In addition, the reflection phase shift is depicted versus the corresponding relative permittivity at the center frequency of $f_0$=299.7 GHz in FIG. 5C, which shows a maximum phase shift of about Δφ=133° with a bias line voltage of approximately 6 V. Also shown in the inset 510 of FIG. 5C is the extracted relative permittivity of the EC material at each bias voltage step at (f=67 GHz). A correlation between these two curves gives an approximate relationship between tunable reflection phase shift (Δφ) to the applied bias voltage ($V_{Bias}$), as also shown in FIG. 5C. In a practical reflectarray antenna, such a Δφ–$V_{Bias}$ graph is usually provided to apply a proper bias voltage to each specific element in the array in order to create the required phase shift.

Using the unit cell of FIGS. 3A-3D with the dimensions as depicted in Table 1, an example embodiment of a reflectarray antenna is shown in FIGS. 6A-6D.

Figures 6A, 6B:
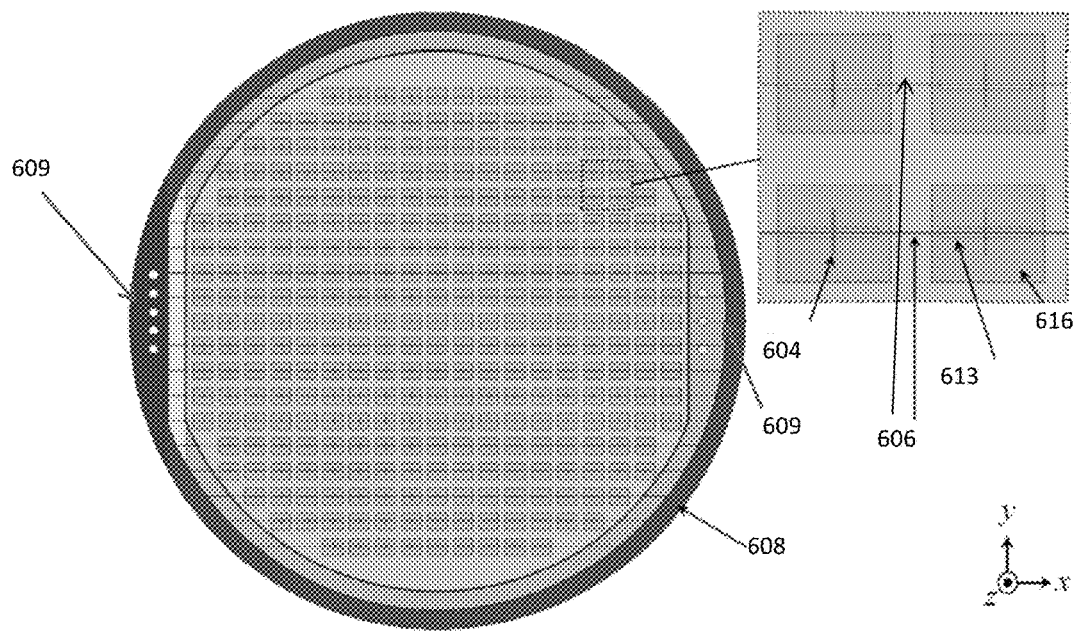
FIGS. 6A-6D show a reflectarray using the unit cell of FIGS. 3A-3D.
Figure 6C:
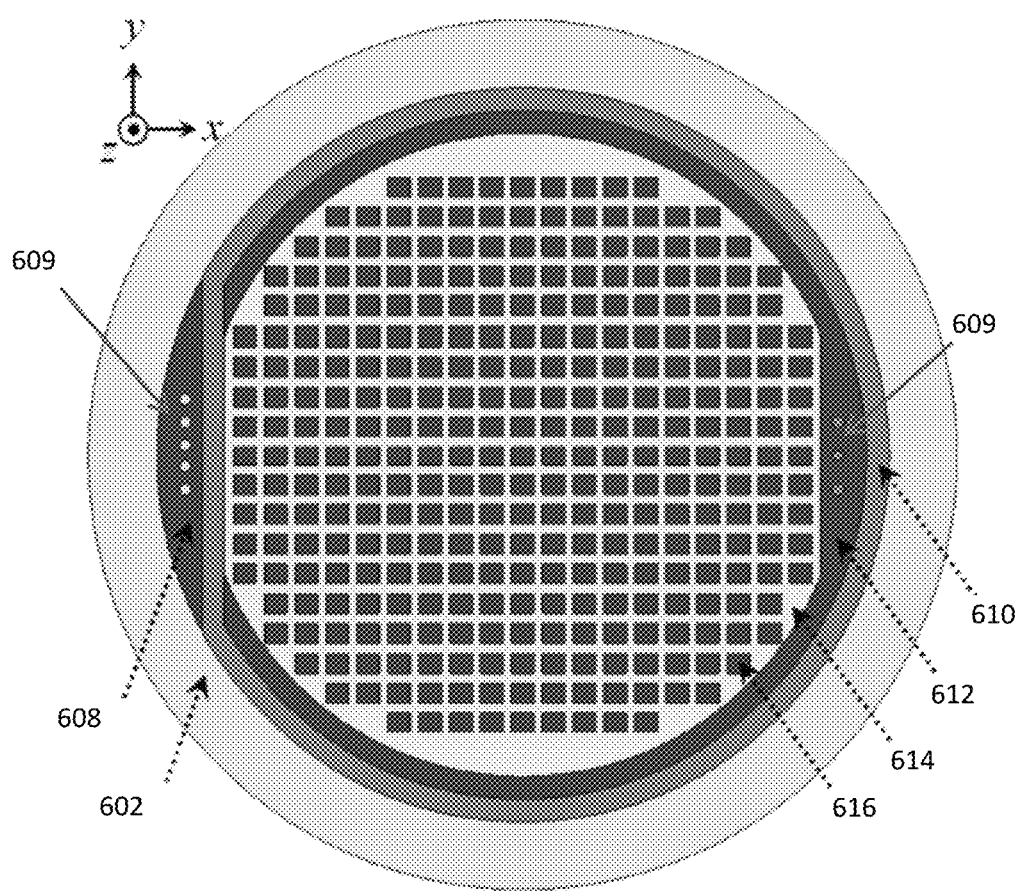
Figure 6D:
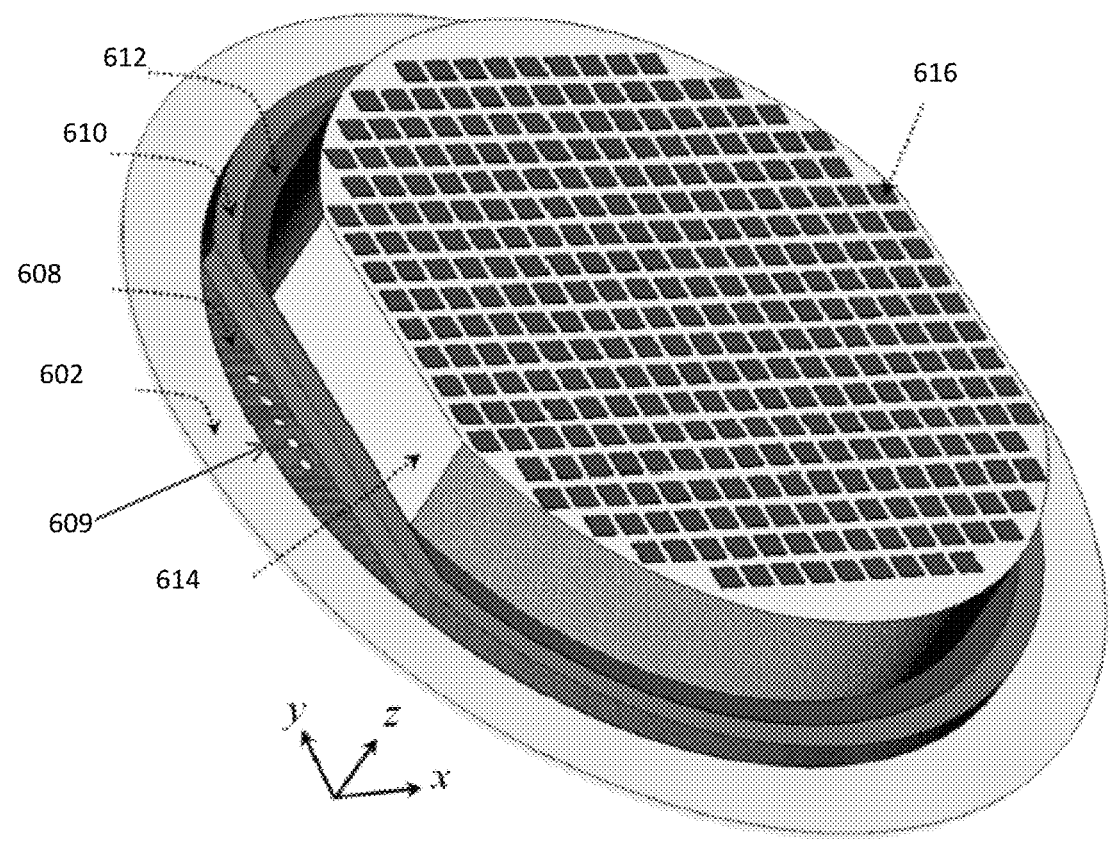

FIG. 6A shows a transparent view of the reflectarray (the ground plane is indicated by the slots) with inset FIG. 6B, FIG. 6C shows a top view and FIG. 6D shows a perspective view. The same reference numbers in each figure indicate the same elements.

Each layer of the EC element as shown in FIGS. 3A-3D is sequentially deposited on a silicon wafer and isolation layer 602 corresponding to layers 202 and 204 in FIG. 3D. Delay lines 604 (206 in FIGS. 3A-3D) are coupled to bias ring 608 by bias lines 606. Bias ring 608 includes vias 609 on either side of the wafer which may be used to help identify coordinates while soldering and setting up the structure in a measurement jig. EC layer 610 corresponds to layer 208 of FIG. 3D while slotted ground plane layer 612 including slots 613 corresponds to layer 210 of FIGS. 3A-3D. Patch substrate 614 supports patch antennas, represented at 616.

FIGS. 6A-6D show a structure which allows the application of a bias voltage between ground plane 612 and delay lines 604 which sandwich EC layer 610. This provides a mechanism wherein the tunable dielectric may operate at both unbiased and biased states. To identically bias all elements in the periodic environment, all the delay lines in each row are interconnected by 3-μm wide bias lines 606 to a common biasing connection ring 608.

The EC reflectarray as described above provides a mechanism for electronically controlling the phase of the reflected signal at each unit cell. In an alternative embodiment, a shape of a radiating may be changed, either through controlling the phase at each unit cell using bias lines or by controlling the size and/or dimensions of the unit cell. In a further embodiment, controlling the phase using bias lines may be used to electronically tilt the direction of the main beam or to change the polarity of a circular polarized beam from RHCP (right hand circular polarization) to LHCP (left hand circular polarization) and vice versa.

An electrochromic reflectarray antenna as discussed above represents just one of the many realizations of reflectarrays using EC materials and, by no means, is meant to indicate the only possible realization. Other realizations are possible, but not exhaustive, such as 1. Selecting a different set of EC materials for EC layer 208 of FIG. 3D.
2. Selecting a different unit cell size.
3. Selecting a different frequency of operation, $f_0$.
4. Using a different array size or number of unit cells.
5. Using independently controlled bias lines for each unit cell element.

What is claimed is:

1. An antenna element, comprising:
   a substrate comprising silicon;
   an isolation layer on the substrate comprising a microstrip line connected perpendicularly to a bias line;
   an electrochromic layer on the isolation layer;
   a ground plane layer on the electrochromic layer comprising a slot perpendicular to the microstrip line;
   a patch substrate layer on the ground plane layer; and
   a patch antenna on the patch substrate layer;
   wherein the electrochromic layer is configured such that applying a voltage to the bias line changes a permittivity of the electrochromic layer and creates a phase shift of the antenna.

2. The antenna element of claim 1, wherein the patch substrate further comprises a dielectric that is one of silicon dioxide or benzocyclobutane.

3. The antenna element of claim 1, wherein the microstrip line is filled with gold.

4. The antenna element of claim 1, wherein the electrochromic layer further comprises a plurality of sublayers.

5. The antenna element of claim 4, wherein the electrochromic layer further comprises a chromic sublayer of tungsten oxide ($WO_3$), titanium oxide ($TiO_2$), molybdenum trioxide ($MoO_3$), tantalum oxide ($Ta_2O_5$), niobium pentoxide ($Nb_2O_5$) or another transition metal oxide.

6. The antenna element of claim 4, wherein the electrochromic layer further comprises a chromic sub layer of nickel oxide (NiO), chromium oxide ($Cr_2O_3$), manganese oxide ($MnO_2$), iron oxide ($FeO_2$), cobalt oxide ($CoO_2$), rhodium oxide ($RhO_2$), iridium oxide (Ira) or another transition metal oxide.

7. The antenna element of claim 4, wherein the electrochromic layer further comprises one or more electrolyte sublayers of lithium niobate ($LiNbO_3$) or any electrolyte displaying different ion and electron conductivities.

8. The antenna element of claim 1, wherein the isolation layer further comprises a dielectric that is one of silicon dioxide, silicon nitride or benzocyclobutane.

9. The antenna element of claim 1, wherein the patch antenna is formed of gold.

10. The antenna element of claim 1, wherein the ground plane layer is formed of gold.

11. A reflectarray antenna comprising a plurality of antenna elements, each antenna element further comprising:
    a substrate comprising silicon;
    an isolation layer on the substrate comprising a microstrip line connected perpendicularly to a bias line;
    an electrochromic layer on the isolation layer;
    a ground plane layer on the electrochromic layer comprising a slot perpendicular to the microstrip line;
    a patch substrate layer on the ground plane layer; and
    a patch antenna on the patch substrate layer;
    wherein the electrochromic layer is configured such that applying a voltage to the bias line changes a permittivity of the electrochromic layer and creates a phase shift of the plurality of antenna elements.

12. The reflectarray antenna of claim 11, wherein the bias line of each antenna element is operatively coupled to a same voltage.

13. The reflectarray antenna of claim 11, wherein the bias line of each antenna element is operatively coupled to a different voltage.

14. The reflectarray antenna of claim 11, wherein the applying the voltage to the bias line changes a shape of a beam radiating from the reflectarray antenna.

15. The reflectarray antenna of claim 11, wherein the applying the voltage to the bias line changes a direction of a beam radiating from the reflectarray antenna.

16. The reflectarray antenna of claim 11, wherein the applying the voltage to the bias line changes a polarity of a circular polarized beam radiating from the reflectarray antenna.

17. A method of making an antenna element further comprising a patch antenna, a dielectric substrate, a slotted ground plane, an electrochromic layer, and a microstrip line, comprising:
    selecting an operating frequency;
    determining a thickness of the dielectric substrate, $H_{diel} > \lambda_g/40$ where $\lambda_g$ is a guided wavelength associated with the operating frequency;
    determining a length of the patch antenna, $Y_{patch}$;
    determining a length of the antenna element $P_y$;
    determining a width of the patch antenna ($X_{patch}$) and the microstrip line ($X_{line}$) to match an input impedance to a characteristic impedance of the microstrip line;
    determining a width of the antenna element $P_x$;
    determining a length ($X_{slot}$) and width ($Y_{slot}$) of a slot in the slotted ground plane; and
    determining a length of the microstrip line ($Y_{line}$).

18. The method of claim 17, wherein the determining the length of the patch antenna, $Y_{patch}$ further comprises selecting a length between approximately $\lambda_g$ and $\lambda_g/2$.

19. The method of claim 17, wherein the determining the length ($X_{slot}$) and width ($Y_{slot}$) of the slot in the slotted ground plane and determining the length of the microstrip line ($Y_{line}$) further comprises:
  selecting a value for $Y_{line}$ that provides an optimal phase shift with low loss; and
  varying $X_{slot}$ until an optimal coupling level is found.

* * * * *